UNITED STATES PATENT OFFICE.

DAVID NEEDHAM, OF OSKALOOSA, IOWA.

IMPROVEMENT IN TANNING.

Specification forming part of Letters Patent No. 27,823, dated April 10, 1860.

*To all whom it may concern:*

Be it known that I, DAVID NEEDHAM, of Oskaloosa, in the county of Mahaska and State of Iowa, have invented a new and Improved Process of Tanning; and I do hereby declare that the following is a full, clear, and exact description of the same.

My invention consists in applying to the hides a peculiar composition of matter to prepare them for the tanning-liquor. This preparatory composition consists of a decoction of hemp-seed and of hops mixed with sal-soda and animal-brain, and the proportions in which I mix these ingredients are about as follows: hemp-seed, one peck; hops, one pound boiled in eight gallons of water; sal-soda, one-fourth pound; animal-brain, one-fourth pound.

The hemp-seed and the hops are boiled in a vessel of brass or wood until all the strength is extracted, and when the decoction is yet blood-warm the sal-soda and the animal-brain are added in about the quantities above stated, and the whole is now well strained. This mixture is diluted with forty gallons of cold water. After the hides have been soaked in this liquor from six to thirty-six hours, according to the temperature of the atmosphere and to the nature of the hides themselves, I put them in a tanning-liquor consisting of catechu, divi-divi, alum, and salt, mixed together in about the following proportion: catechu, twelve pounds; divi-divi, four pounds; alum, four pounds; common salt, two pounds. Tanning-liquor of this kind, when applied to the hides without the preparatory composition, causes the leather to crack when the same is used, like most of the quick-tanned leather.

By using the preparatory composition in combination with the tanning-liquor composed as above stated, or of any other ingredients of similar action, the hides are prepared to receive the tannin and to combine with the same perfectly in a much shorter time than when the hides are brought directly into the tanning-liquor. For this reason my leather is soft and not liable to crack, whereas other quick-tanned leather, when used a short time, begins to crack and becomes useless.

I am well aware that the tanning-liquor composed as above described consists of ingredients well known for this purpose, and I do not consider myself the inventor of this composition. Neither do I confine myself to use my preparatory composition exclusively with the tanning-liquor composed as above stated, for it has the same effect with any other tanning-liquor containing a large surplus of free tannin.

What I claim as new, and desire to secure by Letters Patent, is—

The within-described process of tanning, consisting in the application to the hides of a solution composed of the within-specified materials, mixed about in the proportion specified, preparatory to treating them with the tanning-liquid.

DAVID NEEDHAM.

Witnesses:
 J. W. CUNNINGHAM,
 WM. LOUGHRIDGE.